(12) United States Patent
Conner

(10) Patent No.: US 6,681,584 B1
(45) Date of Patent: Jan. 27, 2004

(54) METHOD AND APPARATUS FOR COOLING AND CLEANING AIR

(76) Inventor: Leo B. Conner, 2444 N. 39th Pl., Phoenix, AZ (US) 85008

( * ) Notice: Subject to any disclaimer, the term of this patent is extended or adjusted under 35 U.S.C. 154(b) by 0 days.

(21) Appl. No.: 10/253,369

(22) Filed: Sep. 23, 2002

(51) Int. Cl.$^7$ .............................. F28D 3/00; F25D 17/00
(52) U.S. Cl. ........................................... 62/171; 62/179
(58) Field of Search ......................... 62/171, 179, 304, 62/506, 332, 121, 305, 238.1, 238.6

(56) References Cited

U.S. PATENT DOCUMENTS

| | | | | |
|---|---|---|---|---|
| 2,835,476 A | * | 5/1958 | Kohut, Jr. ..................... | 257/3 |
| 3,153,332 A | * | 10/1964 | Goettl et al. .................. | 62/305 |
| 3,859,818 A | * | 1/1975 | Goettl ........................... | 62/311 |
| 4,178,764 A | * | 12/1979 | Rowe ............................ | 62/81 |
| 4,698,979 A | * | 10/1987 | McGuigan .................... | 62/171 |
| 4,932,218 A | * | 6/1990 | Robbins ........................ | 62/171 |
| 5,325,681 A | * | 7/1994 | Ellis et al. ..................... | 62/314 |
| 5,778,696 A | | 7/1998 | Conner | |
| 5,911,745 A | | 6/1999 | Conner | |
| 5,970,723 A | * | 10/1999 | Kinkel et al. ................. | 62/121 |
| 6,122,922 A | | 9/2000 | Conner | |
| 6,202,429 B1 | * | 3/2001 | Kinkel et al. ................. | 62/171 |
| 6,223,545 B1 | * | 5/2001 | Kinkel et al. ................. | 62/171 |
| 6,247,327 B1 | * | 6/2001 | An et al. ....................... | 62/314 |
| 6,253,559 B1 | * | 7/2001 | Kinkel et al. ................. | 62/91 |

* cited by examiner

*Primary Examiner*—Marc Norman
(74) *Attorney, Agent, or Firm*—Schmeiser, Olsen & Watts LLP (57) ABSTRACT

The present invention provides a method and apparatus for efficiently using various components in combination as a system for cooling and cleaning air. The apparatus uses the combination of an evaporative cooler with a water reservoir and a refrigerated air system with a water-cooled condenser. A pump or series of pumps are used to supply water to the evaporative cooler and to the water-cooled condenser from the water reservoir. A mechanism for controlling the hardness of supplied water may also be included. After the reservoir water has been supplied to the other components in the system, it is returned to the water reservoir. During less humid Summer conditions, the output air from the evaporative cooler is supplied to a series of ducts and is used to cool the interior of a structure such as a home. When the outside ambient temperature and/or humidity levels exceeds the capabilities of the evaporative cooler for cooling the interior of the structure to the desired temperature, the output air from the evaporative cooler is partially re-directed to one or more adjacent spaces of the structure and the refrigerated air from the refrigerated air system is used to cool the interior of the structure. A portion of the output air from the evaporative cooler is also added to the air of the refrigerated air conditioning system to clean, humidify, and pressurize the air going into the living spaces. By using the output air from the evaporative cooler to cool an adjacent space, the overall cooling load on the refrigerated air system is reduced. In addition, the use of the water from the evaporative cooler reservoir to condense the refrigerant vapors will enable the system to achieve even greater efficiency.

16 Claims, 3 Drawing Sheets

METHOD AND APPARATUS FOR COOLING AND CLEANING AIR

BACKGROUND OF THE INVENTION

1. Technical Field

The present invention relates to changing the ambient air temperature, cleanliness, and humidity inside a structure and, more specifically, to a cooling method and apparatus which provides a simple, yet very energy-efficient, means of cooling the interior of a structure with clean, humidified air.

2. Background

Human beings are known for their ability to adapt to their environment and to adapt their environment to them. One example of this quality is the continued expansion of human populations into areas previously deemed inhospitable to human life. Desert communities such as Phoenix, Arizona and Las Vegas, Nev. are two well-known and rapidly growing areas which support burgeoning populations. In order to survive in these hot, desert climates, most structures designed for human occupation are provided with one or more systems for cooling the air inside the structure. Some of the various types of systems used to cool the air inside a structure are typically rated by using a system which assigns a Seasonal Energy Efficiency Ratio (SEER) rating or number to the system. A higher SEER rating indicates a more efficient system when compared with a system having a lower SEER rating.

One popular method of cooling the air inside a structure that has been adopted in many hot climates is the evaporative cooler. Evaporative coolers use a simple combination of a water pump, absorbent cooling pads, and a fan to provide cool air. Using basic principles of gravity and evaporation, air is cooled by forcing it through the evaporative cooler. Water is pumped into water-retaining pads which line the interior surface of the evaporative cooler and the outside air is drawn into the evaporative cooler by a large blower fan. By drawing the outside air through the water-soaked cooling pads, heat is transferred from the air to the water as water evaporation occurs and the cooled air is blown into the structure, thereby cooling the interior of the structure. The passage of the air through the pads deposits many airborne contaminants into the water and onto the pads.

While generally effective, evaporative coolers have certain well-known limitations. For example, as the outside air temperature increases, the evaporation process cannot sufficiently lower the temperature of the air in a structure to provide an acceptable temperature for human occupation. The evaporation rate, however, will continue to increase as the temperature increases. In addition, in very humid climates, evaporative coolers can be ineffective for cooling occupied structures at even relatively low ambient air temperatures due to the high amount of water vapor in the air. Once the air is saturated with water vapor, no additional evaporative cooling can take place. However, cooling by conduction and convection can still take place, so that pad water at 80 degrees F. can still cool hotter air at 100% humidity that transits the pads. Furthermore, pad water at 90 degrees F. can still be cooled by cooler air at 100% humidity that transits the pads.

To overcome the limitations associated with evaporative coolers, people living in many desert climates have turned to refrigerated air-conditioning systems to cool the air inside a structure. Instead of using the principles of evaporation, traditional refrigerated air-conditioning systems use the properties of refrigerant gases such as Freon to cool the temperature of the air.

While very effective, refrigerated air-conditioning systems suffer from several undesirable characteristics. Foremost, these systems are relatively expensive to operate when compared to the nominal operational costs associated with most evaporative coolers. During the hottest part of the summer in more severe desert climates, the cooling costs associated with supplying electricity for a refrigerated air-conditioning system for even modest-sized homes can become exorbitant. Secondly, the compressors, fans, and motors used in typical residential air-conditioning systems are very loud and can contribute to a high level of ambient noise in some residential areas. In addition, the size and shape of the various components of the refrigerated air-conditioning system makes them somewhat unsightly next to a residence. Finally, the continued growth in the use of air-conditioning systems requires an ever-increasing expenditure of precious resources to generate the electricity necessary to operate the systems.

In some areas of the country, evaporative coolers and refrigerated air conditioning systems are both used, during different parts of the season, to cool the air inside a structure. In a typical scenario, an evaporative cooler may be used to reduce the ambient air temperature inside a structure during the relatively cooler and drier spring and early summer months (i.e., April, May, and June). Then, once the outside ambient air temperature and/or humidity has exceeded the capabilities of the evaporative cooler, typically in July, August, and possibly September, the evaporative cooler is switched off and the refrigerated air-conditioning system is used to reduce the ambient air temperature. Towards the end of the summer months as the fall season arrives, temperatures and humidity levels drop, and the evaporative cooler may once again be adequate to provide the desired cooling effect. While alternating the use of the two systems provides a better trade off between efficiency and effectiveness than using either system alone, these alternate use systems still leave room for improvement.

Some combinations of evaporative coolers and refrigerated air conditioners are currently practiced. U.S. Pat. No. 5,778,696 to Conner (Jul. 14, 1998) discloses an apparatus in which water from a swimming pool is first used to cool the condenser of a refrigerated air conditioner and is then used as input water to an evaporative cooler. An unevaporated portion of the water is returned to the swimming pool as cooled water. When the refrigerated air conditioner is running, the air output of the evaporative cooler is directed into an attic space to lessen the workload of the air conditioner by reducing the heat flow to the living spaces and adjacent spaces.

While these systems substantially improved cooling and energy efficiency, room for improvement remained. When the refrigerated air conditioner is cooling a dwelling space portion of the structure and the evaporative cooler is cooling the attic, contaminants within the dwelling space are recirculated. Contaminants are both generated within the dwelling space and enter the dwelling space from outdoors. Air filters trap large dust particles but miss small particles and gases. Because the air pressure is the same inside the dwelling space as outside the house, contaminants can migrate into the dwelling space from outdoors. As a result, the summer months may be less healthy for the occupants than the winter months. In late Spring and early Fall, the evaporative cooler blows cooled, cleaned outside air into the building, affecting a complete change in the dwelling space air several times a day. Air typically exits the house through cracks around doors and windows, as well as some vents. Furthermore, the air from an evaporative cooler is humidified as a byproduct of the evaporative cooling process. Desert air is sometimes too dry for human health and comfort, so the humidity provided by evaporative coolers is a benefit.

What is needed, therefore, is an apparatus and method for more efficiently cooling the interior of structures, particularly in hot desert climates where refrigeration is the primary method of cooling, while simultaneously decreasing the overall consumption of electric power and providing a cleaner, healthier supply of air to breath. Without developing more efficient methods for providing cool, clean air in hot desert climates, operating expenses borne by consumers for refrigerated air-conditioning systems and health care will continue to rise and our earth's natural resources will continue to be diminished at an excessive rate.

SUMMARY OF INVENTION

An embodiment of the present invention utilizes a water reservoir, at least one water pump, an evaporative cooler, ductwork with controllable louvers, and a refrigerated air-conditioning system with a water-cooled condenser to provide a cleaner and more energy-efficient means (SEER values up to 24 or more, including the evaporative cooler power consumption) for cooling a house, an office, a retail store, or other enclosed space. In addition, by selectively using the evaporative cooler to cool the interior of adjacent spaces in a structure, such as an attic, garage, or workshop, the cooled adjacent spaces act as a buffer zone between sun-heated roof and exterior walls and the ceiling and walls of the structure which is to be cooled. The introduction of the cooled output air from the evaporative cooler into the adjacent space significantly reduces the temperature differential between the air inside the dwelling portion of the structure and the ambient air temperature in the adjacent space. This, in turn, reduces the cooling load on the refrigerated air-conditioning system, that is used to cool the dwelling space inside the structure. The combination of the two cooling systems, operating in tandem to control the air temperature inside the structure, provides a better trade-off between effectiveness and efficiency than either system operating independently over the whole range of outside temperature and humidity. This system will reduce the overall operating costs and energy consumption required to cool the interior space of a given structure to one-third of the cost of systems using only refrigerated air conditioners.

Additionally, since water-cooled condensers are more energy-efficient than the typical air-cooled condenser coils used in most residential and other small air-conditioning systems, the use of a water-cooled condenser in conjunction with the present invention further reduces operating costs. A refrigerated air-conditioning system utilizing an embodiment of the present invention utilizes smaller components and is less obtrusive, visually and audibly, than a more conventional cooling system.

During periods when the refrigerated air-conditioning system is the primary source of cool air to the living space, an embodiment of the invention also provides for adding a portion of the evaporative cooler output air flow with the air flow of the refrigerated air-conditioning system. Adding air flows has three benefits. The mixed air is humidified and is cleaner than air recirculated by an air conditioner alone. Because the evaporative cooler uses outdoor air, adding evaporative cooler output air to refrigerated air conditioner air increases the total amount of air going into the living space. This increase in the amount of living space air slightly pressurizes the living space, thereby reducing infiltration of contaminants from outdoors, as well as exhausting a portion of the inside contaminated air to the outside, through existing house vents such as stove, bathroom, and gas heater vents. In an embodiment, the amount of evaporative cooler output added to the refrigerated air conditioning system output is determined by a control system regulating humidity, temperature, pressure, or any combination thereof.

In an embodiment of the present invention, a water reservoir of the evaporative cooler is used to provide water for the evaporative cooler and for the water-cooled condenser as an integral part of the air-cooling system. Depending upon operating parameters, it may be desirable to include a mechanism or method for controlling the hardness of water supplied from the water storage source to the water-cooled condenser. A purge-type of mechanism that removes a portion of high-hardness water is suitable. Such a mechanism may include a conductivity sensor positioned to contact water supplied to the condenser, a hardness monitor linked to the sensor, and control valve triggered to open by the hardness monitor.

Numerous other advantages and features of the present invention will become readily apparent from the following detailed description of the invention, the drawings and the appended claims.

BRIEF DESCRIPTION OF DRAWINGS

Embodiments of the present invention will hereinafter be described in conjunction with the appended drawings, where like designations denote like elements, and.

DETAILED DESCRIPTION OF THE INVENTION

Embodiments of the present invention provide an energy-efficient means of cooling and cleaning air. Various embodiments of the present invention can be readily adapted to provide air-cooling capabilities for homes, offices, and other structures designed for human occupation or for storing temperature sensitive items such as food and other perishables. In addition, other embodiments may be used to cool the ambient air temperature in other storage facilities and may also be used in conjunction with more traditional air-cooling systems to provide higher efficiencies and reduced operating costs.

In accordance with an embodiment of the present invention, an air cooling system uses an evaporative cooler reservoir, a condenser pump, an evaporative cooler, and a refrigerated air-conditioning system to provide a more energy efficient means for cleanly cooling a house, an office, a retail store, or other structure. Another benefit of installing an embodiment of the present invention are the filtering, humidifying, and pressurizing effects on air within the dwelling space as well as a reduction of the noise level of the refrigerating equipment.

Evaporative Cooler Mode

The evaporative cooler discharge air can be used to cool either an adjacent space or the living spaces of a structure, as desired. During the evening and night hours, the output air from the evaporative cooler can be used to directly cool the living spaces of a home or other structure. Then, in the early morning hours, the cool air provided by the evaporative cooler can be redirected into an adjacent space of the home or structure. Once the cool, moist air from the evaporative cooler is no longer directed into the living spaces, the humidity in the living space will begin to drop as the inside temperature rises. This procedure minimizes the residual humidity level in the living spaces and can prevent the unnecessary accumulation of water vapor in the living spaces and the furniture, carpets, drapes, etc. The cool air flowing through an adjacent space reduces the heat flow from an adjacent space to the living spaces, thereby slowing the normal temperature rise in the living spaces. Then, during the course of the day, as the outside temperature continues to increase and the temperature level in the living spaces becomes uncomfortable, the output from the evaporative cooler is once again directed into the living spaces to provide cooler air for reducing the ambient air temperature in the living spaces.

Figure 1:
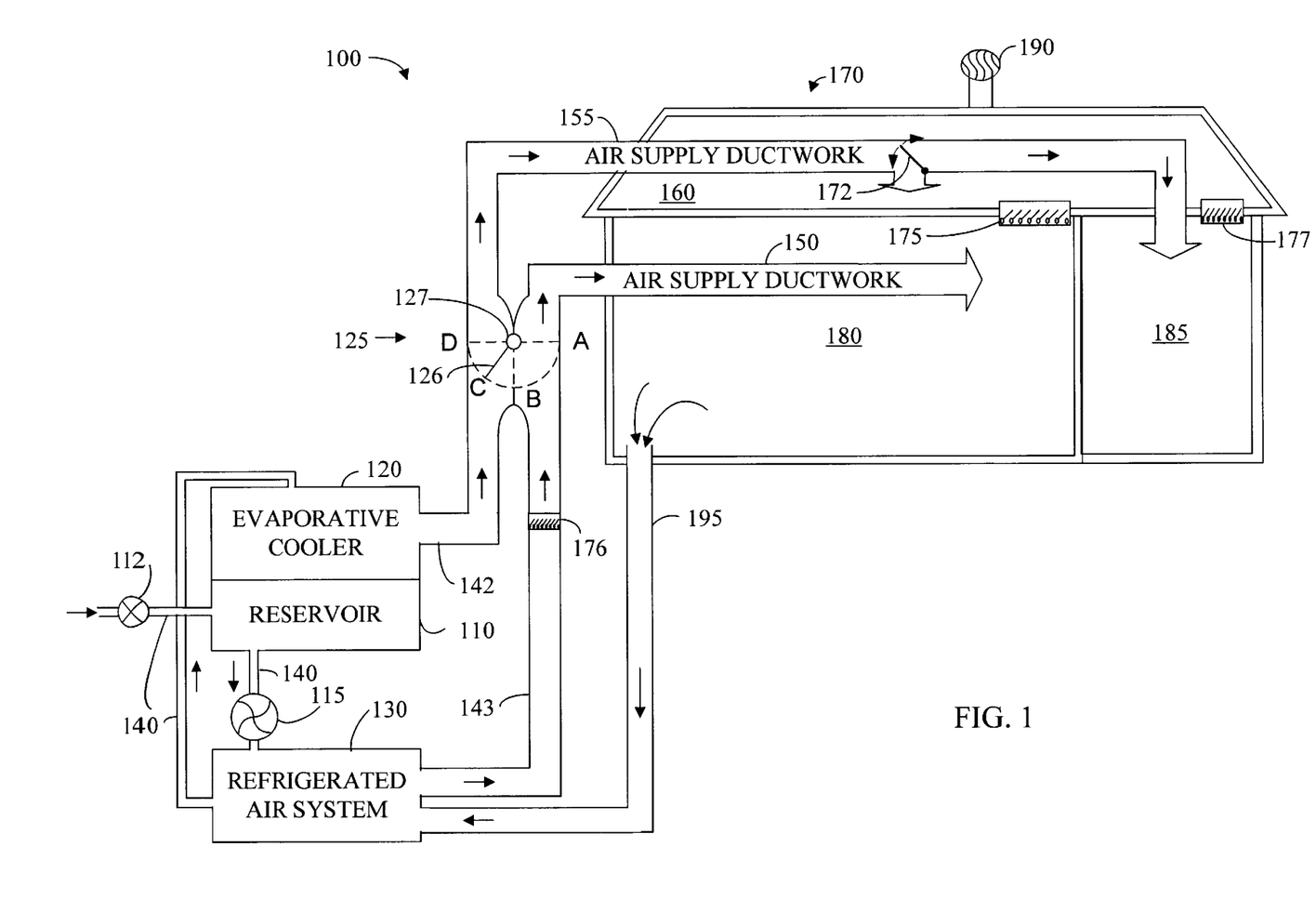
FIG. 1 is a block diagram of a air-cooling and water-cooling apparatus in accordance with an exemplary embodiment of the apparatus.

Referring now to FIG. 1, an air-cooling system 100 in accordance with an exemplary embodiment of the present invention includes: a water reservoir 110; a pump 115; an evaporative cooler 120; an air flow control mechanism 125; a refrigerated air-conditioning system 130; water supply piping 140; a structure 170; a bypass louver 172, an attic vent 190; return air ductwork 195; water source supply valve 112. Structure 170 further includes: upducts 175, 176 and 177; a living space 180; an attic space 160 adjacent to living space 180; a garage space 185 adjacent to or separate from living space 180; a first air supply ductwork 150 for living space 180; and a second air supply ductwork 155 for adjacent spaces 160 and 185.

Water source 110 is a water storage unit and may be any relatively large body or container of water suitable to supply the amount of water necessary for system 100 to operate as described herein. In the residential setting, water source 110 may be a reservoir 110 integral to the evaporative cooler 120, as shown. In an industrial setting, water source 110 may be a water storage tank or a series of water storage tanks. In an agricultural setting, water source 110 may be a pond.

Air flow control mechanism 125 is a four-port airflow control mechanism. A first port receives cooled air output from the evaporative cooler 120 through duct 142. Duct 142 is notional: in some embodiments, duct 142 may have a zero length. A second port receives cooled air output from the refrigerated air conditioning system through duct 143 from the refrigerated air conditioning system. Duct 143 is also notional: in some embodiments, duct 143 may have a zero length. A third port opens into ductwork 150 and a fourth port opens into ductwork 155. By adjusting the position of the louver 126 in the air flow control mechanism 125, the output air from evaporative cooler 120 and refrigerated air conditioning system 130 may be directed, added, or both. Air flow control mechanism 125 may comprise an actuator motor 127, responsive to a control signal from a humidity, temperature, or combined temperature and humidity controller. Air flow control mechanism 125 may comprise at least one off-the-shelf control louver 126 or may be custom made as a discrete unit.

The output air flow of the evaporative cooler 120 may be directed to either or both of two different air supply ductwork systems 150 and 155 by air flow control mechanism 125. Ductwork systems 150 and 155 may be inside the structure 170 or outside the structure 170, or partially inside and outside of the structure 170. The first ductwork 150 distributes cooled air throughout the living space 180. The second ductwork 155 distributes cooled air to adjacent spaces, such as attic 160 or garage 185. In some embodiments, there may be additional or different adjacent spaces. For examples, storage rooms, closed-in porches, and crawl spaces may be adjacent spaces. When air flow control mechanism 125 directs evaporative cooler 120 output air to adjacent spaces, bypass louver 172 may then be moved to direct air to either the attic 160 or the garage 185, or may be adjusted to split the flow to both. When air flow control mechanism 125 directs all of the evaporative cooler 120 output air to the living space 180, the refrigerated air conditioner 130 is turned off.

Refrigeration/Evaporative Cooler Mode

When the refrigerated air conditioner 130 is the primary source of cool air for the living space 180, air flow control mechanism 125 may be adjusted to add a portion of the evaporative cooler 120 output to the refrigerated air conditioner 130 output. There are primarily three beneficial results of this addition of evaporative cooler 120 output air. First, cleaner air is provided for the living space 180. Second, humidified air is added into the living space 180. Third, the air pressure inside the living space 180 is raised relative to the outside air.

Combined evaporative cooler 120 and refrigerated air conditioner 130 operation provides cleaner air by bringing in outside air that has been filtered through the pads of the evaporative cooler 120. This is an improvement over recycling the same air for reuse with a refrigerated air conditioner 130, and adding unfiltered air from outdoors through vents, windows, crevices, and doorways. In an embodiment of the invention, the evaporative cooler 120 has enhanced air-cleaning capabilities. In that embodiment, the water going into the pads of the evaporative cooler 130 pads may have two different flow rates. A first, lower, flow rate may be used during normal operations to keep the pads soaked with water. A second, higher flow rate may be used to flush contaminants out of the pads. Periodically, the input water flow rate is raised to the higher rate to flush the pads. In such an embodiment, the reservoir 110 and the water piping 140 of the evaporative cooler 120, as well as pump 115, should be sized for the faster flow rate.

The second benefit is that humidified air is added into the living space 180. In an embodiment of the invention, the amount of humidified air added to the flow may be regulated by a control system that senses the humidity in the living space 180 and the refrigerated air conditioner 130 output, and changes the position of the air flow control mechanism 125 to maintain a desired humidity level in the living space 180. Humidity controllers are known in the art and may be adapted to the present invention by one of average skill in the art.

In another embodiment, the amount of humidified air added to the flow may be regulated by a temperature-only control system, as is known in the art. For example, air flow control mechanism 125 may be controlled to allow the maximum amount of humidified air consistent with maintaining a desired temperature in the living space 180. In yet another embodiment, both temperature and humidity are controlled. For example, the temperature control system may take priority control whenever the temperature exceeds a predetermined maximum, say 75 degrees F. Priority control is control taken irrespective of the other (here, humidity) controller. Below 73 degrees F., the humidity control system may take priority control whenever the humidity falls below a predetermined minimum, say 42 percent. In the dead band between 73 and 75 degrees F., the last controller to take priority control will determine the position of air flow control mechanism 125.

For another example, a controller may accept as input the temperatures and humidity levels of the outputs of the refrigerated air conditioning system 130, as well as the temperature and humidity of the living space, and then determine the correct setting of air flow control mechanism 125 to maintain a desired combination of temperature and humidity. That is, a "comfort space" is defined as an area on a graph of temperature vs humidity, bounded by minimum and maximum temperatures as a function of humidity and minimum and maximum humidity as a function of temperature. The controller acts to maintain the temperature and humidity within that comfort space. In a variation on this example, different parts of the comfort space may be selected at different times of the day. Those of skill in the art of environmental controllers will appreciate that there are many approaches for using the two cooling air sources to maintain comfort and economy.

The third advantage is that the air pressure inside the living space 180 is raised relative to the outside air. The refrigerated air conditioner 130 will not by itself, raise the air pressure in the living space 180 because the refrigerated air conditioner 130 puts out the same amount of air that it takes in. The evaporative cooler 120, however, takes in outdoor air and blows it into the living space 180. The living space 180 is slightly pressurized by the addition of the output air from the evaporative cooler 120. As a result, air flow from the living space 180 through cracks, crevices, and vents is from the inside of the living space 180 to the outdoors. This drastically reduces the amount of unfiltered air moving into the living space 180 from outdoors. In addition, the contamination of the inside air will be reduced by dilution with the clean fresh, evaporative cooler air.

In an embodiment, air flow control mechanism 125 may be controlled to maintain a desired pressure within the living space 180. The pressure may be the exclusive control variable or temperature and humidity may also be considered. In particular embodiments, the pressure is controlled to be one-half inch to one inch greater than the pressure of the outside air. In another embodiment, the pressure may be lowered to maintain the desired temperature.

The attic vent 190 is provided to allow hot air to escape from attic space 160. Return air duct work 195 will supply input air from the living space 180 to the refrigerated air conditioning system 130. The input air to the evaporative cooler 120 is outdoor air.

The exact size and number of components, horsepower rating of motors, length of tubing, and other factors relating to performance of system 100 as shown in FIG. 1 can be modified and adapted to suit the specifications of almost any given cooling requirement. For example, if more air flow is desired, the size of the fan or the fan speed in evaporative cooler 120 may be increased. If a larger volume of refrigerated air is required for a specific environment, the size of refrigerated air-conditioning system 130 may be increased. For both aesthetic purposes and economic reasons, smaller, less obtrusive equipment should be selected wherever possible. In an embodiment of the present invention, the main components for refrigerated air-conditioning system 130 are relatively small and may be placed out of sight behind evaporative cooler 120.

Wherever possible, embodiments of the present invention will include an arrangement where the cooling components (evaporative cooler 120 and refrigerated air-conditioning system 130) are placed on the ground to reduce exposure to sun and the heat generated from roofing materials. This desired placement will also allow easy access to the components for repair and maintenance. In addition, when the components are placed on the ground, less noise from the equipment will be conducted through the building structure into the living spaces.

An exemplary embodiment of the air flow control mechanism 125 is shown in FIG. 1. The air flow control mechanism 125 comprises an actuator 127 which moves a control vane, or louver, 126 over a 180 degree arc between positions A and D, and two sections of ductwork 142 and 143 having an opening between them. Actuator 127 may be, for example, a solenoid or a stepper motor. For another example, actuator 127 may be a manual control. In position A, the zero-degree position, vane 126 closes off ductwork 150 and stops the cooled air flow to the living space 180. In position A, all cooling air goes to the adjacent spaces 160 and 185 through ductwork system 155. Upduct 176 will prevent the air from flowing in ducts 143 and 195 to living spaces 180. This position would normally only be used to benefit persons temporarily working in the adjacent spaces. In position B, the 90-degree position of the vane 126, the opening between ductwork systems 142 and 150 is closed by vane 126. All output air from the evaporative cooler 120 is channeled to the adjacent spaces 160 and 185 through ductwork systems 142 and 155. All output air from the refrigerated air conditioning system 130 is channeled to the living spaces 180 through ductwork systems 143 and 150. In position C, which may be between 91 and 179 degrees, the vane directs a portion of the output air from the evaporative cooler 120 into ductwork 143 where it adds to and combines with the output air from the refrigerated air conditioning system 130, and is channeled into the living spaces 180 through ductwork system 150. It should be obvious to those of skill in the art that the pressure of the evaporative cooler 120 output air must be higher than the pressure of the refrigerated air conditioning system output air over the area of the opening through which the addition of the two output airs occurs. In position D, the 180-degree position, the air flow to the adjacent spaces 160 and 185 is cut off. The output air from the evaporative cooler 120 moves into the living spaces 180 through ductwork systems 142 and 150. When the vane 126 is in position D, the refrigerated air conditioning system 130 is typically shut off.

In a particular embodiment, the output air of the evaporative cooler 120 is the input air to an evaporator section of the refrigerated air conditioning system 130. That is, the air that is cooled by passing it over a cooling coil of the refrigerated air conditioning system 130 is the air from the evaporative cooler 120. In this embodiment, the evaporator reduces the humidity of the evaporative cooler output air by condensing a portion of the water vapor. In a preferred embodiment, the evaporator section is located within the living space 180 and a condensing unit section is located outside of the building structure.

Air Flow-Evaporative Cooler Mode

As shown in FIG. 1, in an embodiment of the present invention, the air flow for structure 170 can be routed into structure 170 in several different ways in order to accommodate the most effective and efficient use of system 100 for cooling the temperature of the air contained in structure 170. Whenever ambient air conditions outside structure 170 permit, cool air for the interior of structure 170 will be supplied, as needed, from evaporative cooler 120 with evaporative cooler pump 115 recirculating the water for evaporative cooler 120. When system 100 of FIG. 1 is operated using only evaporative cooler 120, water can be supplied to system 100 through alternate water source supply valve 112 (make-up water for 110) and from a water source other than water source 110. In that case, refrigerated air-conditioning system 130 is shut off. Further, air flow control mechanism 125 is positioned at position so that the air flowing out of evaporative cooler 120 is directed into air supply ductwork 150. Air supply ductwork 150 can be any type of air supply system used by those skilled in the art to deliver air into the various desired portions of living space 180.

In addition, in an embodiment of the present invention, an upduct or vent 175 is supplied between living space 180 and attic space 160. Upduct 175 comprises a one-way louvered vent that allows air flow upward into the attic space 160 but does not allow flow from the attic space 160 to the living space 180. Upduct 175 is suitably located on the end of structure 170 opposite evaporative cooler 120 to enhance air circulation. The pressure differential will enhance air flow and move the cool air more effectively through structure 170. In addition, it is important to note that a window or other opening may also serve as a vent for system 100. However, this will reduce the overall efficiency of system 100 because the cool air from living space 180 will not be vented through attic space 160, which is the most effective use of the cooled air from living space 180. Air in living space 180 will flow into attic space 160 through upduct 175 and be vented to the outside via attic vent 190, thereby cooling attic space 160 as the air passes through. Garage 185 may be similarly equipped with an upduct 177. Upduct 176 in the refrigerated air conditioning system output duct 143 prevents flow into the refrigerated air system when only the evaporative cooler is operating.

When using only evaporative cooler 120 to cool living space 180, the fan in evaporative cooler 120 may be operated 24 hours a day. Evaporative cooler pump 115 can also operate 24 hours a day. The monthly cost for using evaporative cooler 120 to cool a home with 2,000 sq/ft of living space 180 is approximately $15/month in the greater Phoenix area. Typically, air flow control mechanism 125 is positioned so that the output air from evaporative cooler 120 can be used to cool living space 180 during the evening and night hours. By using this approach, the air in living space 180 and attic space 160 can be cooled to a temperature of approximately 70° F. by morning, depending upon the dew point of the outside ambient air.

In the morning, air flow control mechanism 125 can be repositioned and the output air from evaporative cooler 120 can be redirected into attic space 160. With no cooling provided for living space 180, the ambient air temperature in living space 180 will gradually begin to rise, even though adjacent spaces 160 and 185 are being cooled. During this time, the humidity in living space 180 will gradually diminish, making living space 180 less humid and allowing the carpets, furniture, and drapes in living space 180 to lose some absorbed moisture previously introduced by evaporative cooler 120.

When the ambient air temperature in living space 180 exceeds the desired level, air flow control mechanism 125 is repositioned so the output air from evaporative cooler 120 is redirected into living space 180. The ambient air temperature in living space 180 will gradually decrease to a more comfortable level. While using only evaporative cooler 120, the refrigeration system is not used. Depending on the temperature and humidity conditions, evaporative cooler 120 may be used to cool only adjacent spaces 160 and 185, thereby maintaining a low humidity level in living space 180 yet still effectively reducing the heat transfer from adjacent spaces 160 and 185.

Air Flow-Refrigerated Air-Conditioning Mode

Whenever the ambient air temperature and/or humidity outside structure 170 exceeds the capability of evaporative cooler 120 to effectively cool the air for use in cooling living space 180, air flow control mechanism 125 is positioned (position B) so that air flowing from evaporative cooler 120 is primarily directed into adjacent spaces 160 and 185. In this case, both evaporative cooler 120 and refrigerated air-conditioning system 130 are operational, and refrigerated air-conditioning system 130 will provide most of the cool air for living space 180. The air flow from evaporative cooler 120 will reduce the ambient air temperature in attic space 160 from approximately 140 F. to approximately 100 F. when the ambient air temperature outside structure 170 is approximately 110 F. To operate system 100 in this manner, evaporative cooler pump 115 is turned on. In an embodiment, a small amount of the air flowing out of evaporative cooler 120 may be added to the air flowing out of the refrigerated air conditioner to increase the humidity, pressure, and cleanliness of the air in the living space 180. The amount may be determined by a humidity control system, a temperature control system, or both.

The significant decrease in ambient temperature for the air in adjacent spaces 160 and 185 will, in turn reduce the cooling load on refrigerated air-conditioning system 130, and thereby effectively reduce the operational expenses for system 100. In this mode, attic vent 190 vents hot air from attic space 160 to the outside. When using refrigerated air conditioning system 130 to provide cool air for living space 180, the previously mentioned upduct 175 is closed to prevent the cool air from being vented to attic space 160. Return air is supplied to refrigerated air-conditioning system 130 via return air ductwork 195.

Figure 2:
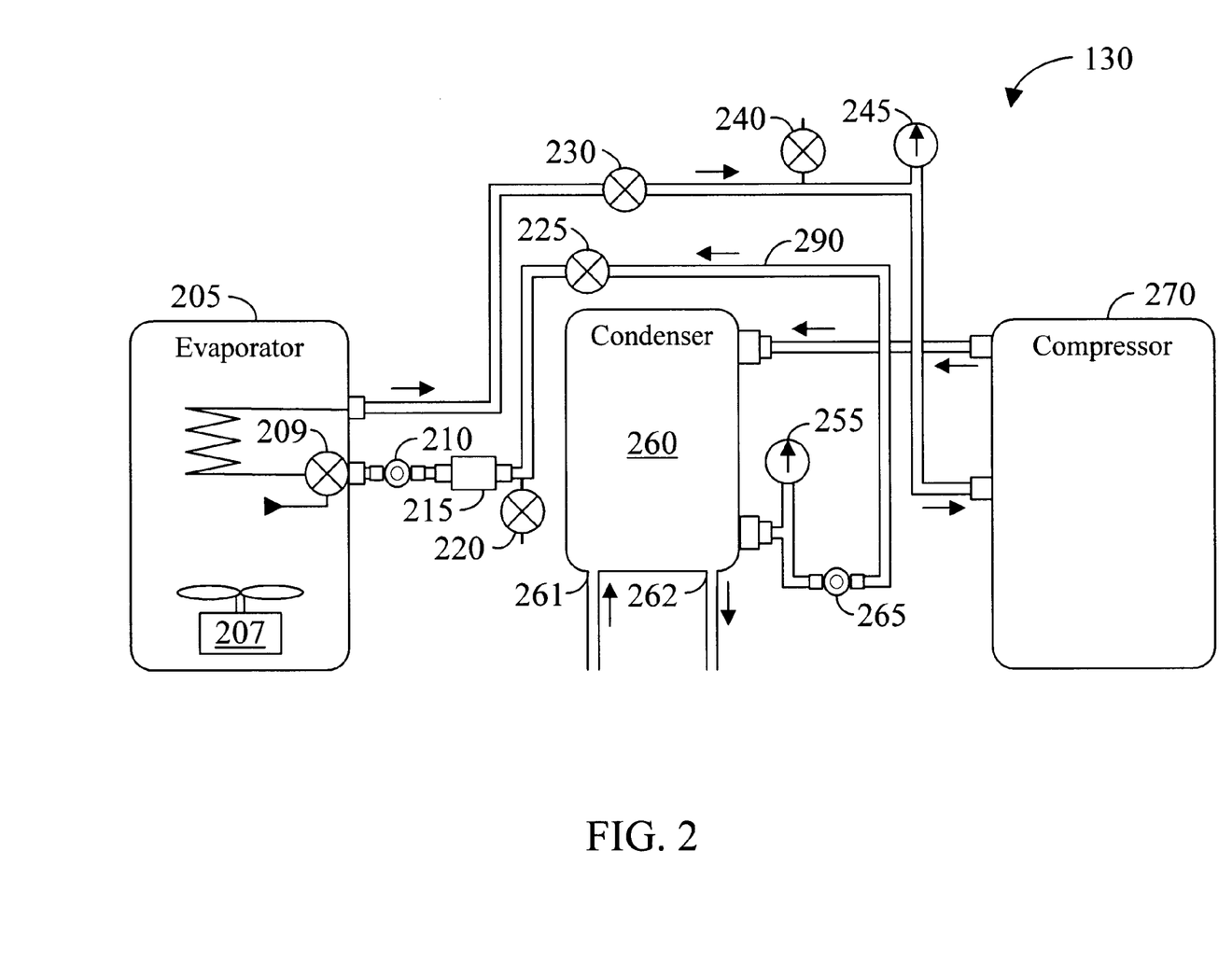
FIG. 2 is a schematic diagram of the main components of a refrigerated airconditioning system in accordance with an exemplary embodiment of the apparatus.

Referring now to FIG. 2, a refrigerated air-conditioning system 130 in accordance with an embodiment of the present invention includes: evaporator 205; evaporator fan motor 207; expansion valve 209; filter/drier 215; fill/evacuation valves 220 and 240; ball valves 225 and 230; gauges 245 and 255; condenser 260; compressor 270; sight glasses 210 and 265; and piping 290. System 130 will typically utilize refrigerant gas for a heat transfer fluid.

Condenser 260 and compressor 270 together are the "condensing unit" for the refrigerant in system 130. The condensing unit functions to condense the refrigerant vapor to a liquid. This is accomplished by compressing the refrigerant and cooling it until it liquefies. Compressor 270 increases the pressure of the refrigerant vapor and the cool water flowing through condenser 260 removes the heat from the refrigerant vapor to condense the refrigerant to a liquid.

Condenser 260 is a durable, high-efficiency, water-cooled condenser that provides heat transfer capabilities for system 130. Condenser 260 presents adequate thermally conductive surface area to remove the heat from the refrigerant that flows through condenser 260. For the purposes of illustration to support system 130 as shown in FIG. 2, condenser 260 is approximately 4" by 4" by 18" with multiple stacked thermally conductive plates for heat transfer. It is desirable to provide a condenser 260 which causes a turbulent flow over the surface area of condenser 260 plates to maximize heat dissipation from the refrigerant vapor through the plates and to the water flowing through condenser 260. Water is supplied to condenser 260 by pump 115 (see FIG. 1). The temperature of the water entering condenser 260 at inlet opening 261 is approximately 80° F. and the temperature at outlet opening 262 will be approximately 85° F. The outlet water is supplied to evaporative cooler 120.

One specific example of a water-cooled condenser suitable for use with refrigerated air-conditioning system 130 is condenser CB50-38 manufactured by Alfa-Laval in Sweden. While other types of condensers may be used, they are generally larger, less efficient, and/or more susceptible to damage. One specific example of a compressor suitable for use with refrigerated air-conditioning system 130 is the Copeland ZR28K1-PFV from the Copeland Corporation of Sydney, Ohio.

Refrigerant Flow

Referring now to FIG. 2, the refrigerant flow for system 100 can be illustrated. Refrigerant vapor flows from evaporator 205 to compressor 270 and from compressor 270 to condenser 260. Evaporator 205 is typically mounted on a furnace unit (not shown) located within structure 170. Most furnace units include provisions to mount an evaporator such as evaporator 205 on the top of the furnace unit. The blowers of the furnace unit blow air from living space 180 through a heat exchanger (evaporator) to evaporate the refrigerant and cool the air. The liquid refrigerant is boiled in the evaporator by heat absorbed from the air, thereby cooling the air, and the liquid refrigerant becomes a gas. The gaseous refrigerant is compressed by compressor 270 and is then routed to condenser 260 where the heat is removed by the cool water flowing through condenser 260. One heat exchanger (evaporator 205) suitable for use with system 100 is model TXC049A4HPA0 supplied by The Trane Company, of La Crosse, Wis. The exact location of evaporator 205 will be dictated, in large part, by the manufacturer's specification and installation directions. System 100 can accommodate any practical location for evaporator 205.

Sight glasses 210 and 265 are used to verify that the liquid refrigerant is free of vapor bubbles and is completely condensed as it enters evaporator 205. Ball valves 225 and 230 can be used to isolate the condensing unit from the evaporator unit during maintenance. Filter/drier 215 is used to remove any water and sediment or particulates from the refrigerant as it flows through system 130. Fill/evacuation valves 220 and 240 can be used to add or remove refrigerant from system 130. Gauges 245 and 255 are used to monitor the pressure in system 130.

It should also be noted that the specific valves, gauges, and other details shown in FIG. 2 are not all necessary for all embodiments of system 130. Many of these devices are included merely for operator convenience and to aid in troubleshooting system 130. In order to reduce initial installation costs, many of the valves, gauges, and sight glass elements shown may not be included in all embodiments of refrigerated air-conditioning system 130.

Water Flow

Figure 3:
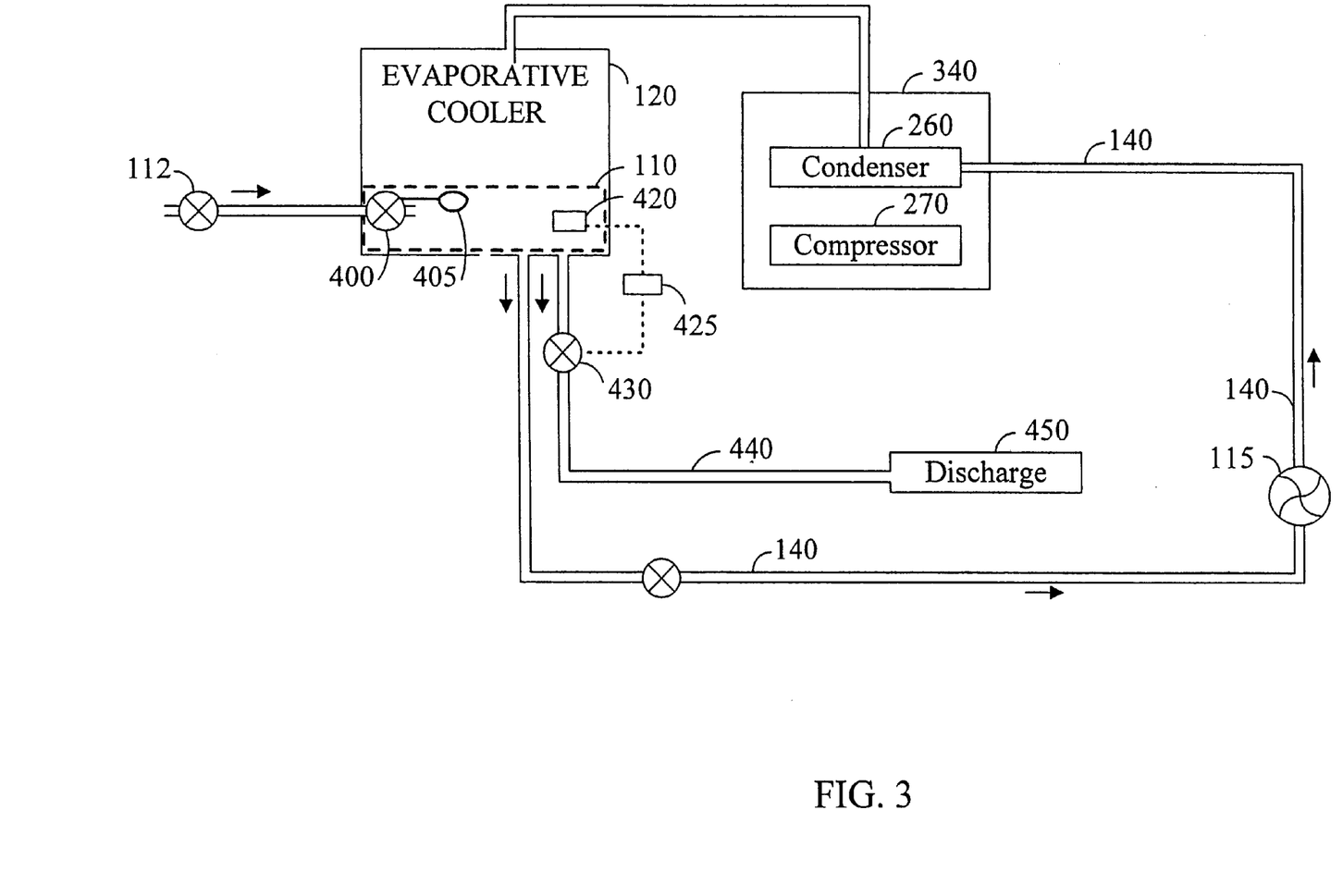
FIG. 3 is a block diagram showing the water flow of a system in accordance with an exemplary embodiment of the present apparatus.

Referring now to FIGS. 1, 2 and 3 the water flow for system 100 of FIG. 1 is illustrated. When refrigerated air-conditioning system 130 is operational, water source supply valve 112 will be open to supply makeup water lost through evaporation, and water from reservoir 110 is supplied to pump 115 to condenser 260. Beginning with the water in reservoir 110, the water temperature is nominally 85 F. as it exits condenser 260 and is pumped through system 100 by pump 115.

After the water has flowed through condenser 260, the heat contained by the refrigerant has been transferred to the water. The temperature of the water as it exits condenser 260 at outlet 262 (as shown in FIG. 2) is approximately 85° F. The water is then supplied as inlet water to the top of evaporative cooler 120. As the water flows into evaporative cooler 120, it is gravity fed and then absorbed into at least one pad that forms the walls of evaporative cooler 120. A portion of the water is then evaporated, thereby cooling the water and the air passing through evaporative cooler 120 to a temperature of approximately 80 F. Any unevaporated water is returned to reservoir 110. Thus, the reservoir water temperature remains at approximately 80° F. The evaporative cooler removes all of the heat added by the condenser to maintain a water temperature of 80° F. in the evaporative cooler reservoir.

Condenser pump 115 is sized according to the cooling needs of each specific application environment. For a typical residential structure of approximately 2,000 sq. ft., a 10 gallons per minute (GPM) pump is suitable. Given a required flow estimate of 3 GPM/ton of cooling required, a 10 GPM pump will allow for approximately 3 ⅓ tons of cooling to be provided by system 100. This level of cooling output is sufficient to cool a 2,000 sq. ft. home during the summer in a typical desert climate such as Phoenix, Ariz. Obviously, those skilled in the art will recognize that the size of pump 115 and the associated GPM rating can be optimally selected to provide different levels of cooling for different environments. In addition, based on the location of the various components of system 100, the pressure rating of pump 115 may be increased or decreased as necessary to compensate for any head pressure developed in system 100.

When compressor 270 is not running, the water flow from pump 115 can continue to be supplied to evaporative cooler 120 to be used to cool adjacent spaces 160 and 185, and the water contained in reservoir 110 as described earlier. Any time the evaporative cooler is in service, the water source supply valve 112 must be opened to replace water lost through evaporation.

Reservoir Operation

Referring now to FIG. 3, an examplary embodiment for the water flow of system 100 of FIG. 1 is shown. Such a water flow arrangement is compatible with all of the various arrangements for air flow and refrigerant flow discussed above. Details of the water flow arrangement shown in FIG. 3 include reservoir 110 of evaporative cooler 120. In general, evaporative coolers are fabricated with some sort of water reservoir 110, or catch basin or collection pan, designed to collect unevaporated water that drains from the cooling pads (not shown) within the evaporative cooler 120 and to provide a source of water from which pump 115 can recirculate water back to the top of the cooling pads of evaporative cooler 120. In this manner, an amount of water may be placed in water reservoir 110 and recirculated through evaporative cooler 120 to keep the cooling pads water-soaked and provide the desired cooling effect.

In many conventional self-contained evaporative coolers, a water reservoir 110 is created by providing a collection pan positioned beneath the cooling pads to receive unevaporated water that drains from the cooling pads. Conventionally, the collection pan is capable of holding several gallons of water and a recirculating pump rests in the water in water reservoir 110. For the present apparatus, water reservoir 110 may be sized for twenty gallons. Evaporative cooler pump 115 provides recirculating water to the cooling pads through tubing or piping connected to a water distributor at the top of the cooling pads as described above. Also, such collection pans often include a drain hole in the bottom for draining water reservoir 110 at the conclusion of the hot season. Such a drain hole provides a suitable location for connecting refrigerator unit 340 to water reservoir 110 using piping 140.

As the initial amount of water evaporates during operation of evaporative cooler 120, make-up water to replace the evaporated water may be added to water reservoir 110. Any method or mechanism known to those skilled in the art for adding make-up water may be used in the alternative embodiment of FIG. 3. One common mechanism for adding make-up water is shown in FIG. 3 as a float-operated valve 400 in combination with a float 405. As a water level (not shown) in water reservoir 110 decreases, float 405 lowers in position until, at a preselected position, the mechanism of float-operated valve 400 allows the valve to open and resupply water reservoir 110 with water. The increasing water level then raises the position of float 405 sufficiently to cause the closing of float-operated valve 400. By this mechanism, the water level of water reservoir 110 can be maintained automatically within a desired range, thus, a source from which pump 115 may recirculate water is always provided.

Frequently, an off-the-shelf evaporative cooler includes in a single unit the water reservoir 110, float-operated valve 400, float 405, and pump 115, along with the necessary piping to accomplish the evaporative cooler 120 recirculation shown in FIG. 3. The scope of the present embodiment includes such a self-contained unit as well as arrangements in which the components discussed above are not provided in a single unit, although the self-contained type of unit is suitable and readily available.

It has been determined that a typical water reservoir 110 associated with an evaporative cooler 120 usually contains an amount of water suitable to supply the water needed for system 100 to operate as described herein. Accordingly, piping 140 is provided to couple evaporative cooler reservoir 110 to condensing unit 340 through pump 115 as shown in FIG. 3. Once the water from water reservoir 110 passes through condensing unit 340, the water returns to evaporative cooler 120, where the heat acquired from water-cooled condenser 260 may be dissipated using the evaporative process occurring in evaporative cooler 120. However, the water exiting condenser unit 340 may alternatively be discharged, although it is not economical, unless the discharged water may be put to some other use. Such other uses may include watering vegetation, supplying water to an industrial process, and other uses known to those skilled in the art.

Although not as economical, it is also within the anticipated scope of the present invention that refrigerated air is supplied to a working or living space 180, but no evaporatively cooled air is supplied to another location within a structure 170. In such an arrangement the objective of coupling water-cooled condenser 260 to water reservoir 110 is to provide a recirculating supply of cooled water to assist in generating refrigerated air. Such an arrangement may be desirable in regions that experience high humidity conditions. In high humidity conditions, only a relatively small amount of air cooling can be achieved by an evaporative cooler, thus diminishing a significant portion of the advantage of providing evaporatively cooled air to an attic space 160. However, an evaporative cooler 120 may be used to efficiently dissipate the heat collected from water-cooled condenser 260 by the recirculating water. Thus, while the full benefits of all advantages of the present invention are best suited for regions of low humidity, such as hot, desert climates, some of the advantages of the present invention may nevertheless be obtained in other regions.

As indicated above, it is most economical that the water used in evaporative cooler 120 and in condensing unit 340 is recycled to evaporative cooler 120 to minimize the water demands of a system according to the present invention. Because some of the water is lost to evaporation in the evaporative process and the water is continuously recirculated, it is likely that the quality of the recirculating water will diminish gradually as the concentration increases of various chemical species found in residential and industrial water. Various salts of magnesium and calcium, such as calcium carbonate contribute to the increase of a condition known as water hardness. As hardness increases, the likelihood of mineral deposits accumulating on piping and equipment that contacts the water also increases. Such accumulations can require replacement and cleaning to prevent damage and maintain the level of performance, especially of heat exchange equipment such as condenser unit 260. Accordingly, measures are needed to prevent the accumulation of mineral deposits by maintaining hardness at a sufficiently low level.

The scope of the present invention includes a mechanism for controlling the hardness of water supplied from water reservoir 110 to condenser unit 260. For the sake of simplicity and cost minimization, a purge-type of mechanism is suitable and is shown in FIG. 3. Such a mechanism includes a hardness sensor 420 positioned to contact water supplied to condenser 260 and a hardness monitor 425 linked to hardness sensor 420. Hardness sensor 420 transmits a signal to hardness monitor 425 that gives a quantified indication of hardness for the water. Hardness monitor 425 is, in turn, linked to a control valve 430. When hardness exceeds a maximum limit, hardness monitor 425 generates a signal to control valve 430 to open for a selected time, thus purging from the system a selected amount of high hardness water through discharge piping 440. Hardness sensor 420 may be a conductivity sensor or another type of sensor providing the indicated functions. Also, control valve 430 may be a solenoid valve or another type of valve providing the indicated functions. Further, discharge piping 440 may be any type of tubing or piping, including flexible hose, that allows proper discharge of purged high hardness water, including, in some circumstances, a typical garden water hose.

Selection of the amount of time to leave control valve 430 open may be preselected such that, given the flow rate of water through discharge piping 440 to discharge point 450, a known volume of water may be purged. Alternatively, hardness monitor 425 may be set such that control valve 430 remains open until the quantified indication of hardness produced by hardness sensor 420 reaches a minimum limit. Other control mechanisms are also contemplated. Also, the maximum control limit is typically 400 ppm hardness and the minimum control limit is typically 350 ppm, leaving a control dead band of 50 ppm. Each limit is ultimately dependent upon the particular environment in which the present invention is operating. The two typical limits are suitable for a residential setting where residential water having a hardness of 200 ppm is provided as the make-up water. If the equipment used in such a setting is particularly resistant to mineral deposits, then the maximum control limit may be higher than 400 ppm. Similarly, if equipment is particularly susceptible to influence by mineral deposits, then the minimum upper limit may be less than 350 ppm. Also, the difference between the maximum and minimum limit, the control dead band, may be larger or smaller than 50 ppm, depending upon a need or a lack of a need to control hardness within a certain range.

Once control valve 430 opens and purging begins, the water level within water reservoir 110 will decrease, causing the position of float 405 to lower and open float-operated valve 400. The make-up water entering water reservoir 110 will then dilute the concentration of chemical species in the water to reduce hardness. A variety of positions within the water flow arrangement of FIG. 3 is conceivable for hardness sensor 420 and control valve 430. The primary concern is that water supplied to condenser 260 is kept within a preselected range of hardness, thus hardness sensor 420 can be placed at any location where it contacts water going to or coming from condenser 260. Similarly, the purge of water from the system may occur from water reservoir 110 as shown or from another suitable location within the arrangement shown in FIG. 3. Further, it is also conceivable that a different method or mechanism for adding makeup water to water reservoir 110 may be used in conjunction with the above described mechanism for controlling hardness.

Other possible mechanisms for controlling hardness include those that are adapted to selectively removing chemical species from water that cause hardness, such as reverse osmosis mechanisms, ion exchange mechanisms, filters, and other mechanisms known among those skilled in the art to combat hardness. Additionally, mechanisms may also be used that add selected amounts of one or more chemical agents, that are adapted to counteracting the effects of water hardness rather than physically removing chemical species from the water. It is an advantage of the purging mechanism for controlling hardness that little upkeep and maintenance is required after a one-time purchase and installation cost. Also, the water purged through discharge piping 440 to discharge point 450 may be used as a beneficial source of water for some other purpose, such as watering vegetation or use in an industrial process, reducing the water demands for such other purposes. The alternative mechanisms for controlling hardness discussed herein are suitable for the present invention, but may be more costly and require more maintenance and upkeep than the purging mechanism.

While the invention has been particularly shown and described with reference to exemplary embodiments thereof, it will be understood by those skilled in the art that changes in form and details may be made therein without departing from the spirit and scope of the invention. Accordingly, unless otherwise specified, any dimensions of the apparatus indicated in drawings or herein are given as an example of possible dimensions and not as a limitation. Similarly, unless otherwise specified, any sequence of method steps indicated herein is given as an example of a sequence and not as a limitation.

What is claimed is:

1. An apparatus for cooling the ambient air in a structure, the apparatus comprising:
    a plurality of air supply ductwork systems associated with a structure, the plurality comprising at least a first ductwork system and a second ductwork system;
    an evaporative cooler having a water reservoir and a cooled air output connection to an air flow control mechanism; and
    a refrigerated air-conditioning system having a water-cooled condenser coupled to the evaporative cooler reservoir and a cooled air output connection to the air flow control mechanism;
    wherein the air flow control mechanism is configured to receive output air flows from the evaporative cooler and from the refrigerated air-conditioning system, and the flow control mechanism is operative to add at least portions of the output air flows from both the evaporative cooler and the refrigerated air-conditioning system together to form a combined air flow, and direct the combined air flow to at least one of the plurality of air supply ductwork systems.

2. The apparatus of claim 1, further comprising piping adapted to return to the evaporative cooler at least a portion of any water supplied to the water-cooled condenser.

3. The apparatus of claim 1, wherein the air flow control mechanism is operative to
    add at least a portion of the evaporative cooler output air flow to the refrigerated air-conditioning system air flow;
    direct the combined airflow into the first air supply ductwork system; and
    direct another portion of the evaporative cooler output air flow into the second air supply ductwork system.

4. The apparatus of claim 3, wherein the first air supply ductwork system provides air to a first location in the structure, and the second air supply ductwork system provides air to a second location in the structure.

5. The apparatus of claim 4, wherein the second location in the structure comprises at least one of an attic, a garage, and a workshop.

6. The apparatus of claim 3, wherein the air flow control mechanism comprises an actuator, the actuator responsive to a control signal to change a position of the air flow control mechanism.

7. The apparatus of claim 6, wherein the control signal comprises a function of at least one of pressure, temperature, and humidity.

8. The apparatus of claim 1, further comprising a humidity controller in a living space within the structure, the controller responsive to a level of humidity in the air in the living space and a mechanism responsive to human input to generate the control signal.

9. The apparatus of claim 8, wherein the humidity controller comprises:
    a humidity selector responsive to human input to select a desired humidity;
    a humidity sensor responsive to the humidity of the living space air; and
    a signal generator responsive to the humidity selector and the humidity sensor to generate the control signal.

10. The apparatus of claim 8, further comprising a temperature controller in a living space, the temperature controller responsive to a temperature level in the air within the living space and a mechanism responsive to human input to generate a control signal, wherein the temperature controller and a humidity controller are assigned priority control as a function of the ranges of the levels of temperature and humidity controlled.

11. The apparatus of claim 1, wherein the evaporative cooler is sized, shaped, and plumbed to accommodate both a first flow rate of water and a second flow rate of water into at least one pad, the second flow rate greater than the first flow rate.

12. The apparatus of claim 1, further comprising piping adapted to return to the evaporative cooler at least a portion of any water supplied to the water-cooled condenser.

13. The apparatus of claim 1, wherein the evaporative cooler reservoir coupled to the water-cooled condenser of the refrigerated air-conditioning system comprises a collection pan positioned to receive unevaporated water that drains from cooling pads within the evaporative cooler.

14. A method for economically producing improved interior atmospheres for living spaces which have at least one adjacent space in a structure, the method comprising the steps of:

adding at least a portion of an output air flow from an evaporative cooler to an air flow of a refrigerated air conditioning system to form a combined air flow;

directing the combined air flow into a living space; and directing another portion of an output air flow from the evaporative cooler into at least one space adjacent to a living space in a structure.

15. The method of claim 14, further comprising the step of cooling a condenser of the refrigerated air conditioning system with cooled water from the evaporative cooler.

16. The method of claim 15, further comprising the step of channeling at least a portion of water exiting the condenser into the evaporative cooler.

* * * * *